US006266009B1

(12) United States Patent
Hwang

(10) Patent No.: US 6,266,009 B1
(45) Date of Patent: Jul. 24, 2001

(54) METHOD TO IMPROVE CARRIER SMOOTHING OF CODE PSEUDORANGE FOR GLOBAL POSITIONING AND GNSS RECEIVER IMPLEMENTING THE SAME

(75) Inventor: Patrick Y. Hwang, Marion, IA (US)

(73) Assignee: Rockwell Collins, Inc., Cedar Rapids, IL (US)

( * ) Notice: Subject to any disclaimer, the term of this patent is extended or adjusted under 35 U.S.C. 154(b) by 0 days.

(21) Appl. No.: 09/277,310

(22) Filed: Mar. 26, 1999

(51) Int. Cl.[7] ............................... G01S 5/02; H04B 7/185
(52) U.S. Cl. ............................ 342/357.12; 342/357.01; 342/357.06; 701/200; 701/207; 701/213; 701/214; 375/130; 375/140; 375/147; 375/148
(58) Field of Search .................... 342/357.01, 357.17; 701/200, 207, 213, 214; 375/130–153, 346

(56) References Cited

U.S. PATENT DOCUMENTS

| 4,578,678 | * | 3/1986 | Hurd | 342/357.12 |
|---|---|---|---|---|
| 5,471,217 | * | 11/1995 | Hatch et al. | 342/357.02 |
| 5,590,043 | * | 12/1996 | McBurney | 701/207 |
| 5,726,659 | * | 3/1998 | Kee et al. | 342/357.02 X |
| 5,740,048 | * | 4/1998 | Abel et al. | 701/200 |
| 5,796,773 | * | 8/1998 | Sheynblat | 342/357.01 |
| 5,883,595 | * | 3/1999 | Colley | 342/357.12 |

OTHER PUBLICATIONS

Braff, R., "Description of the FAA's Local Area Augmentation System (LAAS)," *Navigation: J. Of the Inst. Of Navigation*, vol. 44, No. 4, Winter 1997–1998, pp. 411–423.
Doherty, P. et al, "The Spatial and Temporal Variations in Ionospheric Range Delay," in *Proc. of The 10th Technical Meeting of The Satellite Div. of The Inst. Of Navigation*, ION GPS–97, Kansas City, MO, Sep. 16–19, 1997, pp. 231–240.
Goad, C.C., "Optimal Filtering of Pseudoranges," *Navigation: J. of the Institute of Navigation*, vol. 37, No. 3, Fall 1990, pp. 191–204.
Eueler, H. and Goad, C. C., "On Optimal Filtering of GPS Dual Frequency Observations Without Using Orbit Information," *Bulletin Geodesique*, vol. 65, No. 2, 1991, pp. 130–143.
Goad, C. C., "Surveying With The Global Positioning System," in *Global Positioning System: Theory and Applications* vol. II, ed. Parkinson, B. W. and Spilker, J. J., AIAA, 1995.
Hatch, R., "The Synergism of GPS Code and Carrier Measurements," *Proceedings of the 3rd Int. Geodetic Symposium on Satellite Doppler Positioning*, Las Cruces, NM, Feb. 1982, pp. 1213–1231.
Hofmann–Wellenhof, B., et al, *GPS Theory and Practice*, NY: Springer–Verlag, 1993.

(List continued on next page.)

Primary Examiner—Bernarr E. Gregory
(74) Attorney, Agent, or Firm—Nathan O. Jensen; Kyle Eppele; James P. O'Shaugnhnessy

(57) ABSTRACT

A method of smoothing a global navigational satellite system (GNSS) code pseudorange measurement included tracking first and second GNSS signals, at first and second respective frequencies, from a first satellite. A first pseudorange measurement is determined from the first GNSS signal. A smoothed pseudorange measurement is calculated from the determined first pseudorange measurement as a function of both the first and second GNSS signals. In some embodements, the smoothed pseudorange measurement is calculated from the determined first pseudorange measurement as a function of a generalized code pseudorange measurement and as a function of a generalized carrier phase measurement. At least one of the generalized code phase measurement. At least one of the generalized code pseudorange measurement and the generalized carrier phase measurement are dual frequence measurements determined as a function of both the first and second GNSS signals.

18 Claims, 6 Drawing Sheets

OTHER PUBLICATIONS

Hwang, P. Y. and Brown, R. G., "GPS Navigation: Combining Pseudorange with Continuous Carrier Phase Using a Kalman Filter," *Navigation: J. of the Inst. of Navigation,* vol. 37, No. 2, Summer 1990, pp. 175–190.

Loomis, P., et al, "Correction Algorithms for Differential GPS Reference Stations," *Navigation: J. of the Inst. of Navigation,* vol. 36, No. 2, Summer 1989, pp. 91–105.

* cited by examiner

METHOD TO IMPROVE CARRIER SMOOTHING OF CODE PSEUDORANGE FOR GLOBAL POSITIONING AND GNSS RECEIVER IMPLEMENTING THE SAME

FIELD OF THE INVENTION

The present invention relates to global navigational satellite system (GNSS) receivers, such as global positioning system (GPS) receivers. More particularly, the present invention relates to GNSS receivers which implement methods of carrier smoothing code pseudorange measurements.

BACKGROUND OF THE INVENTION

The article, "Enhanced Differential GPS Carrier-Smoothed Code processing Using Dual Frequency Measurements," proceedings of ION GPS-98, The 11$^{th}$ Int. Tech. Meeting of the Satellite Div. of the Inst. of Navigation, Nashville, Tenn., Sept. 15–18, 1998, by p. Y. Hwang, G. A. McGraw and J. R. Bader, is herein incorporated by reference.

Global navigational satellite systems (GNSS) are known and include the global positioning system (GPS) and the Russian global orbiting navigational satellite system (GLONASS). GNSS-based navigational systems are used for navigation and positioning applications In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency f1 of 1575.42 MHz, and an L2 signal having a frequency f2 of 1227.6 MHz. The L1 signal from each satellite is modulated by two pseudo-random codes, the coarse acquisition (C/A) code and the p-code. The p-code is normally encrypted, with the encrypted version of the p-code referred to as the Y-code. The L2 signal from each satellite is modulated by the Y-code. The C/A code is available for non-military uses, while the p-code (Y-code) is reserved for military uses.

GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites.

In conventional GPS receivers, code and carrier pseudorange information has been combined in a complementary filter to suppress multipath and code tracking noise. However, the amount of smoothing, specifically the length of the smoothing time constant, is limited by the dynamics of ionospheric refraction. The smoothing process works best when the ionospheric component is constant. However, this is seldom the case for low-elevation satellites or when there is considerable ionospheric disturbance in the upper atmosphere. This problematic effect is widely known as ionospheric divergence, and arises because the standard form of carrier smoothing with single-frequency measurements is not sufficient to eliminate the ionospheric component.

The limitation of conventional carrier smoothing processing techniques, which is ionospheric divergence between code and carrier, gives rise to a residual ranging error that is proportional to the smoothing filter time constant. Thus, there is a trade-off between the iono-induced smoothing error and the amount of attenuation that can be achieved of slowly-varying code errors such as multipath.

SUMMARY OF THE INVENTION

A method of smoothing a global navigational satellite system (GNSS) code pseudorange measurement includes tracking first and second GNSS signals, at first and second respective frequencies, from a first satellite. A first pseudorange measurement is determined from the first GNSS signal. A smoothed pseudorange measurement is calculated from the determined first pseudorange measurement as a function of both the first and second GNSS signals. In some embodiments, the smoothed pseudorange measurement is calculated from the determined first pseudorange measurement as a function of a generalized code pseudorange measurement and as a function of a generalized carrier phase measurement. At least one of the generalized code pseudorange measurement and the generalized carrier phase measurement are dual frequency measurements determined as a function of both the first and second GNSS signals.

DETAILED DESCRIPTION OF THE PREFERRED EMBODIMENTS

The present invention includes methods for utilizing dual-frequency GPS data to improve the accuracy of carrier-smoothed code pseudorange measurements by eliminating the limitations imposed by ionospheric divergence. With these techniques, the steady state time constant used in the smoothing filter can be vastly extended as long as continuous carrier tracking is maintained.

As used herein, the subscripts 1 and 2 of a term are used to indicate the L-band frequency associated with the term. For example, $\rho_1$ is used to represent L1 pseudorange and $\eta_{\rho 1}$ is used for L1 code multipath and tracking noise. Any term without this subscript designation is considered common to the two frequencies. Any term using a particular subscript shares a common definition with the term using the alternate subscript, as altered to indicate the L-band frequency referred to.

Figure 1:
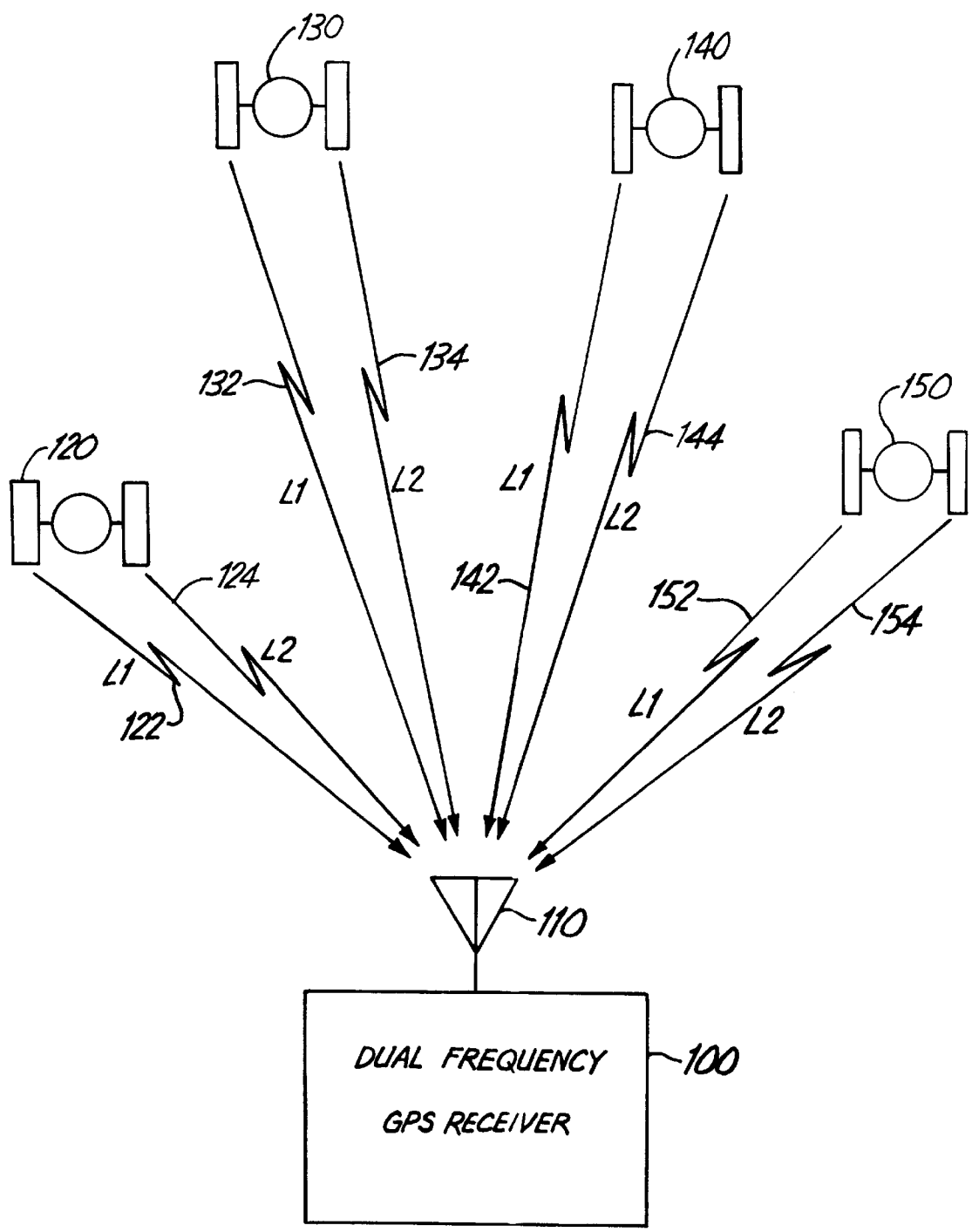
FIG. 1 is a diagrammatic illustration of a dual frequency GPS receiver adapted to implement the code pseudorange measurement smoothing techniques of the present invention.
Figure 2:
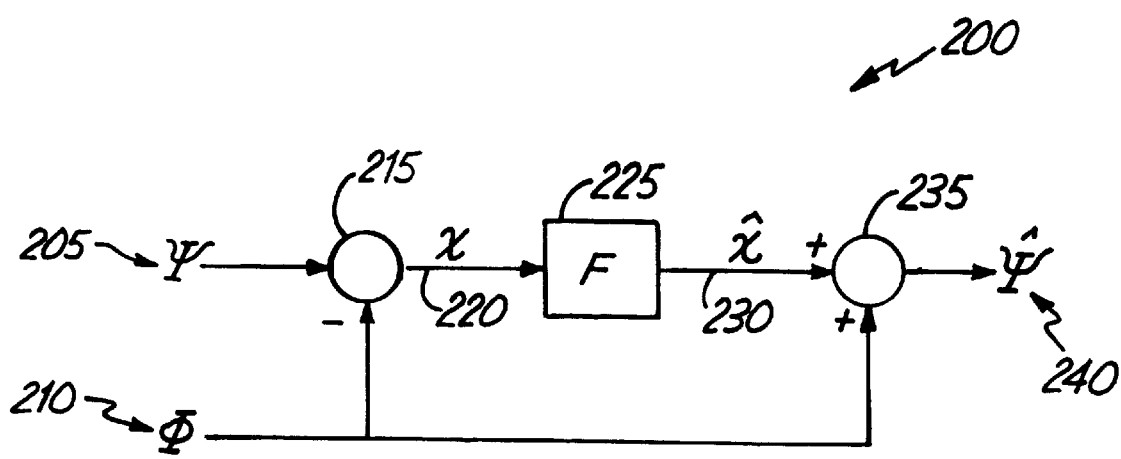
FIG. 2 is a block diagram illustrating carrier-smoothed code processing in accordance with the present invention.

FIG. 1 is a block diagram of dual frequency GPS receiver 100 operating in an environment in which it receives at one or more antennas 110 both L1 and L2 global positioning signals from multiple satellites. As illustrated, satellite 120 transmits L1 positioning signal 122 and L2 positioning signal 124. Satellite 130 transmits L1 positioning signal 132 and L2 positioning signal 134. Satellite 140 transmits L1 positioning signal 142 and L2 positioning signal 144. Satellite 150 transmits L1 positioning signal 152 and L2 positioning signal 154. Typically, positioning signals from other "visible" GPS satellites will also be received by antenna 110 of receiver 100. To generate a navigation solution, receiver 100 must receive positioning signals from at least four GPS satedlites. Dual frequency GPS receiver 100 implements the carrier smoothing methods of the present invention to improve the accuracy of the smoothed pseudorange measurements. The L1 code and carrier signals from a satellite can be modeled as shown in Equations 1 and 2

$$\rho_1 = r + \tau_1 + \eta_{\rho 1} \qquad \text{Equation 1}$$

$$\phi_1 = r - \tau_1 + N_1 + \eta_{100\ 1} \qquad \text{Equation 2}$$

where, $\rho_1$=L1 code pseudorange measurement r=true geometric range, plus other range errors common to pseudorange and carrier phase, including SV clock and ephemeris errors, SA errors and. tropospheric errors $\tau_1$=L1 iono refraction $\eta_{\rho 1}$=L1 code-tracking noise and multipath $\phi_1$=L1 carrier phase measurement $N_1$=range ambiguity for the L1 carrier $\eta_{100\ 1}$=L1 carrier-tracking noise and multipath The L2 code and carrier signals are similarly modeled. The goal of carrier smoothing is to produce a pseudorange measurement with code tracking noise and multipath suppressed. Among the many ways this can be accomplished is with complementary filter 200, as shown in FIG. 2. Filter 200 is implemented by GPS receiver 100 in hardware, firmware or software. The filter input $\Psi$ 205 represents a generalized code pseudorange measurement. The filter input $\Phi$ 210 represents a generalized carrier phase measurement. Inputs 205 and 210 are differenced at differencing node 215 to produce differenced data or signal $\chi$ 220. Differenced data $\chi$ 220 is then filtered using filter 225 to remove unwanted components, for example code tracking noise and multipath. The filtered output data or signal $\hat{\chi}$ is then recombined with the input $\Phi$ 210 at summing node 235 to form complementary filter output $\hat{\Psi}$ 240, which represents the smoothed code measurement.

Some conventional single frequency carrier smoothing techniques simply use the L1 code pseudo-range measurement $\rho_1$ for $\Psi$ and the L1 carrier phase measurement $\phi_1$ for $\Phi$. The difference signal $\chi$ (code-minus-carrier or CMC) is typically filtered by a low-pass filter 225 to attenuate the code noise and multipath. The ultimate usefulness of complementary filter output $\hat{\Psi}$ 240 is dependent on the characteristics of the residual iono term. The carrier smoothing filter introduces an error as it tracks a time-varying iono divergence $I_d (I_d \neq 0)$, the size of which is proportional to the smoothing time constant $\tau$. For a typical value of iono divergence $I_d$ of 0.1 m/min and 100 sec smoothing, the offset is about 33 cm, which would be a non-negligible error in many applications. During a severe ionospheric storm, the divergence can be 5–7 times as large.

Dual frequency GPS receiver 100 is adapted to implement one of the dual-frequency carrier smoothing techniques of the present invention. The dual frequency carrier smoothing techniques of the present invention take advantage of the dual-frequency measurements made by receiver 100 to remove the effects of iono divergence in the smoothing process. In three particular embodiments of the present invention, one of three dual-frequency carrier smoothing methods are utilized. The three dual-frequency carrier smoothing methods include divergence-free smoothing, iono-free smoothing and a method of smoothing the iono refraction. In the various embodiments of the carrier-smoothing methods of the present invention which can be implemented by GPS receiver 100, one or both of the generalized code pseudorange measurement $\Psi$ and the generalized carrier phase measurement $\Phi$ used by complementary filter 200 to produce smoothed pseudorange measurement $\hat{\Psi}$ are dual-frequency in nature.

Figure 3:
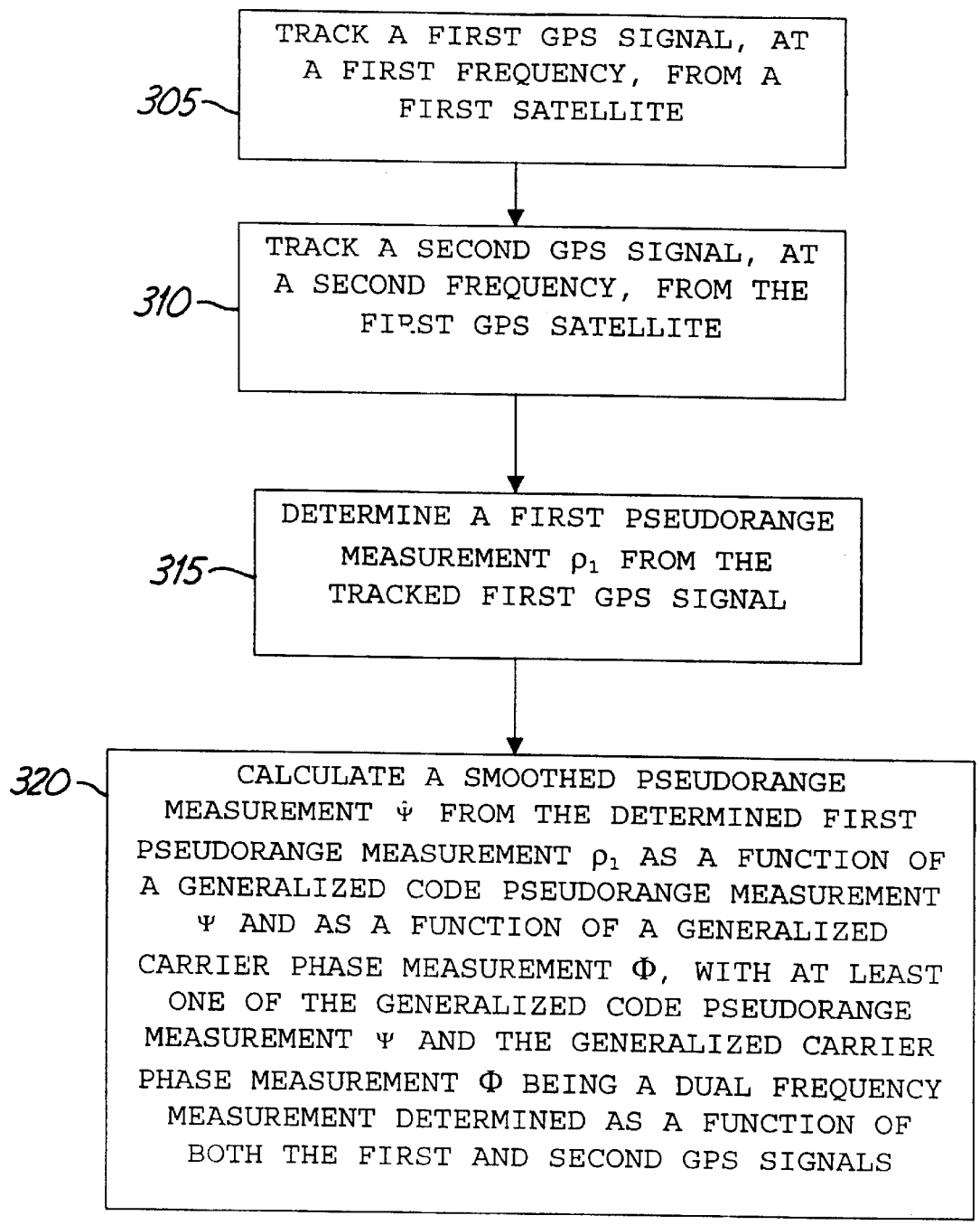
FIG. 3 is a flow diagram illustrating carrier-smoothed code processing methods of the present invention.

FIG. 3 is a flow diagram which illustrates methods of the present invention of using dual-frequency measurements to enhance the carrier smoothing process. The methods illustrated in FIG. 3 are implementable by GPS receiver 100. As shown at block 305 a first GPS signal, at a first frequency (for example the L1 frequency), from a first GPS satellite is tracked. As shown at block 310 a second GPS signal, at a second frequency (for example the L2 frequency), from the first GPS satellite is tracked. As shown at block 315, a first pseudorange measurement $\rho_1$ is determined from the tracked first GPS signal. As shown at block 320, a smoothed pseudorange measurement $\hat{\Psi}$ from the determined first pseudorange measurement $\rho_1$ is calculated as a function of a generalized code pseudorange measurement $\Psi$ and as a function of a generalized carrier phase measurement $\Phi$. In accordance with the present invention, at least one of the generalized code pseudorange measurement and the generalized carrier phase measurement is a dual frequency measurement determined as a function of both the first and second GPS signals.

More specific embodiments of the general method illustrated in FIG. 3 are discussed below in greater detail. The dual-frequency smoothing techniques discussed below rely on the fact that iono refraction can be accurately modeled as inversely related to the square of the GPS frequency Thus the following relationships shown in Equations 3 and 4 can be derived:

$$t_1 - t_2 = \left(1 - \frac{f_1^2}{f_{L2}^2}\right) l_1 \equiv \alpha 1_1 \qquad \text{Equation 3}$$

$$t_2 - t_1 = \left(1 - \frac{f_{L2}^2}{f_{L1}^2}\right) l_2 \equiv \beta 1_2 \qquad \text{Equation 4}$$

Divergerice-Free Smoothing

In accordance with first embodiments of the invention, divergence-free smoothing of the L1 pseudorange is accomplished by designating the complementary filter inputs in FIG. 1 using the relationships shown in Equations 5 and 6.

$$\Psi = \rho_1 \qquad \text{Equation 5}$$

$$\Phi = \phi_1 - \frac{2}{\alpha}(\phi_1 - \phi_2) \qquad \text{Equation 6}$$

Using these definitions for the filter inputs, $\chi$ contains no iono terms. Therefore iono divergence will not affect the smoothing processing. As with conventional carrier smoothing, the error will be dominated by the L1 code tracking noise and multipath, since only insignificant carrier phase noise terms have been added in the processing. Then, $\chi$ can be filtered without any limitations on the smoothing constant, as long as the T1 and L2 carrier phase tracking are continuous so that there is no change in $N_1$ and $N_2$. The smoothed pseudorange contains the same iono refraction as the raw pseudorange. The residual smoothing error, is dominated by tracking noise and multipath associated with $\rho_1$. Thus the residual noise and multipath error will be approximately the same as with the conventional smoothing error.

Following a development analogous to that done for L1 divergence-free smoothing, a divergence-free L2 smoothed pseudorange can be obtained by defining the inputs to filter 200 using Equations 7 and 8:

$$\Psi = \rho_2 \qquad \text{Equation 7}$$

$$\Phi = \phi_2 - 2/\beta(\phi_2 - \phi_1) \qquad \text{Equation 8}$$

Iono-Free Smoothing

The carrier smoothing results given using Equations 5 and 6 (or 7 and 8) yield a smoothed L1 (or a smoothed L2) pseudorange that still contains an iono term. In stand-alone positioning applications, it can be preferable to obtain an iono-free pseudorange instead, "iono free" being defined as a pseudorange without the iono component.

In accordance with second embodiments of the present invention, it can be shown that the following combinations of L1/L2 code and carrier phase defined in Equations 9 and 10 are iono-free:

$$\Psi = \rho_1 - 1/\alpha(\rho_1 - \rho_2) \equiv \rho_2 - 1/\beta(\rho_2 - \rho_1) \qquad \text{Equation 9}$$

$$\Phi = \phi_1 - 1/\alpha(\rho_1 - \rho_2) \equiv \rho_2 1/\beta(\phi_2 - \phi_1) \qquad \text{Equation 10}$$

Using Equations 9 and 10 to define the inputs to complementary filter 200 results in an iono-free CMC.

To illustrate the validity of the dual-frequency smoothing concepts discussed above, a data set of code and carrier phase measurements made simultaneously at L1 and L2 were processed. The plots in FIGS. 4–6 illustrate the iono divergence trend seen in the prior art single-frequency case, and its removal in the dual-frequency cases.

Figure 4:
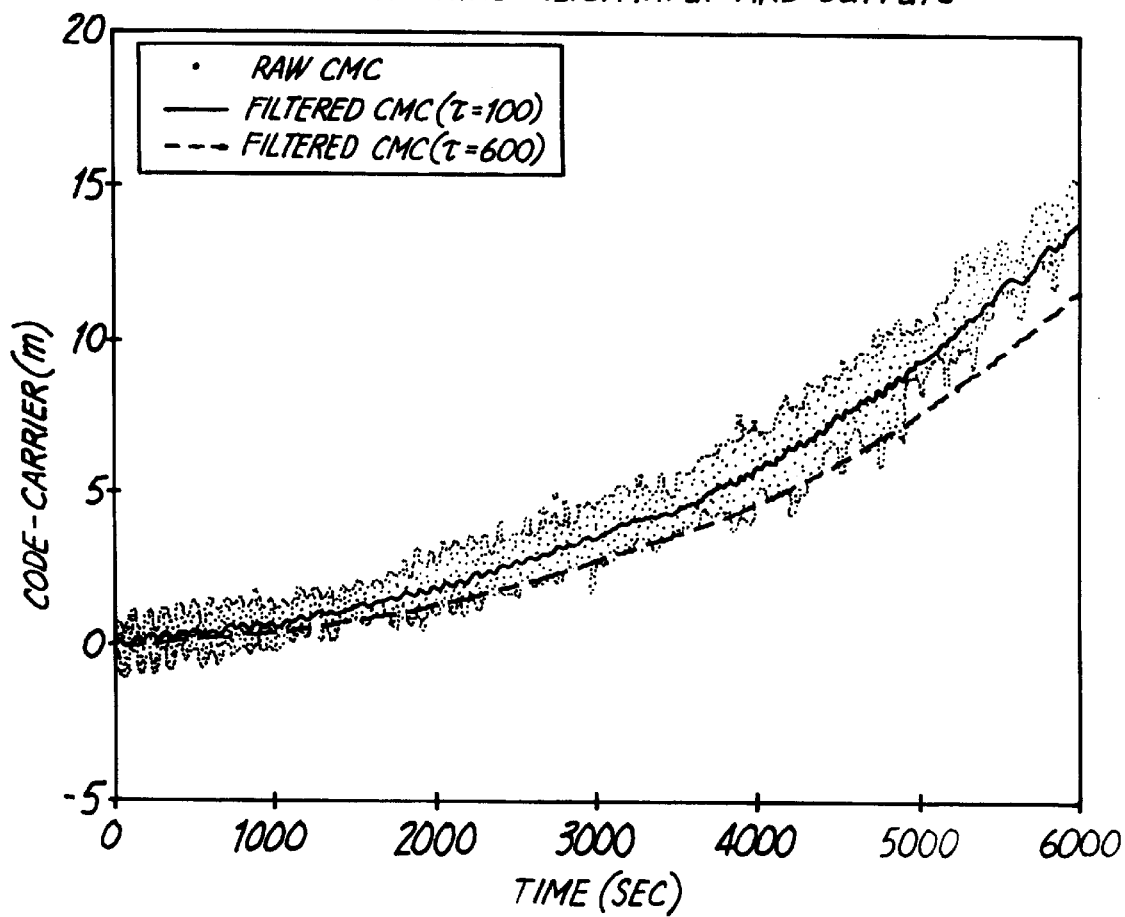
FIG. 4 is a plot illustrating the input and output of a prior art smoothing filter.

FIG. 4 shows the conventional single frequency case. Plotted are the raw CMC and filtered CMC ($\chi$ and $\hat{\chi}$), with filter time constants of 100 and 600 seconds. The initial value of the raw CMC data series was shifted to zero for plotting purposes. Over the 100-minute observation period the total iono delay changes about 7 m (CMC contains twice the iono delay). The 100 s Rime constant case yields a smoothed CMC that exhibits residual multipath errors. On the other hand, the 600 s time constant filter eliminates practically all multipath error oscillations. In both cases, there are noticeable offsets when the iono divergence is large near the end of the observation interval. The offset for the 600 s case is about 2.9 m.

Figure 5:
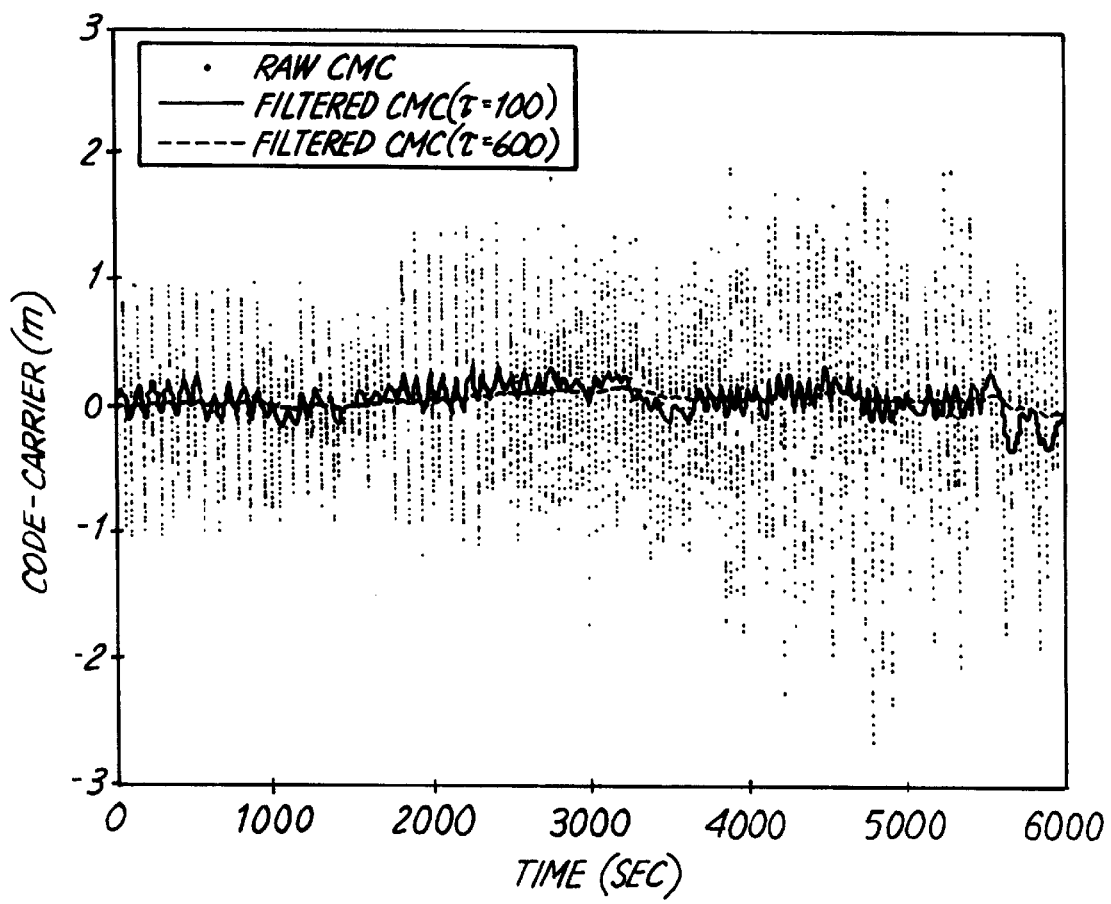
FIG. 5 is a plot illustrating the input and output of a divergence-free smoothing filter of the present invention.
Figure 6:
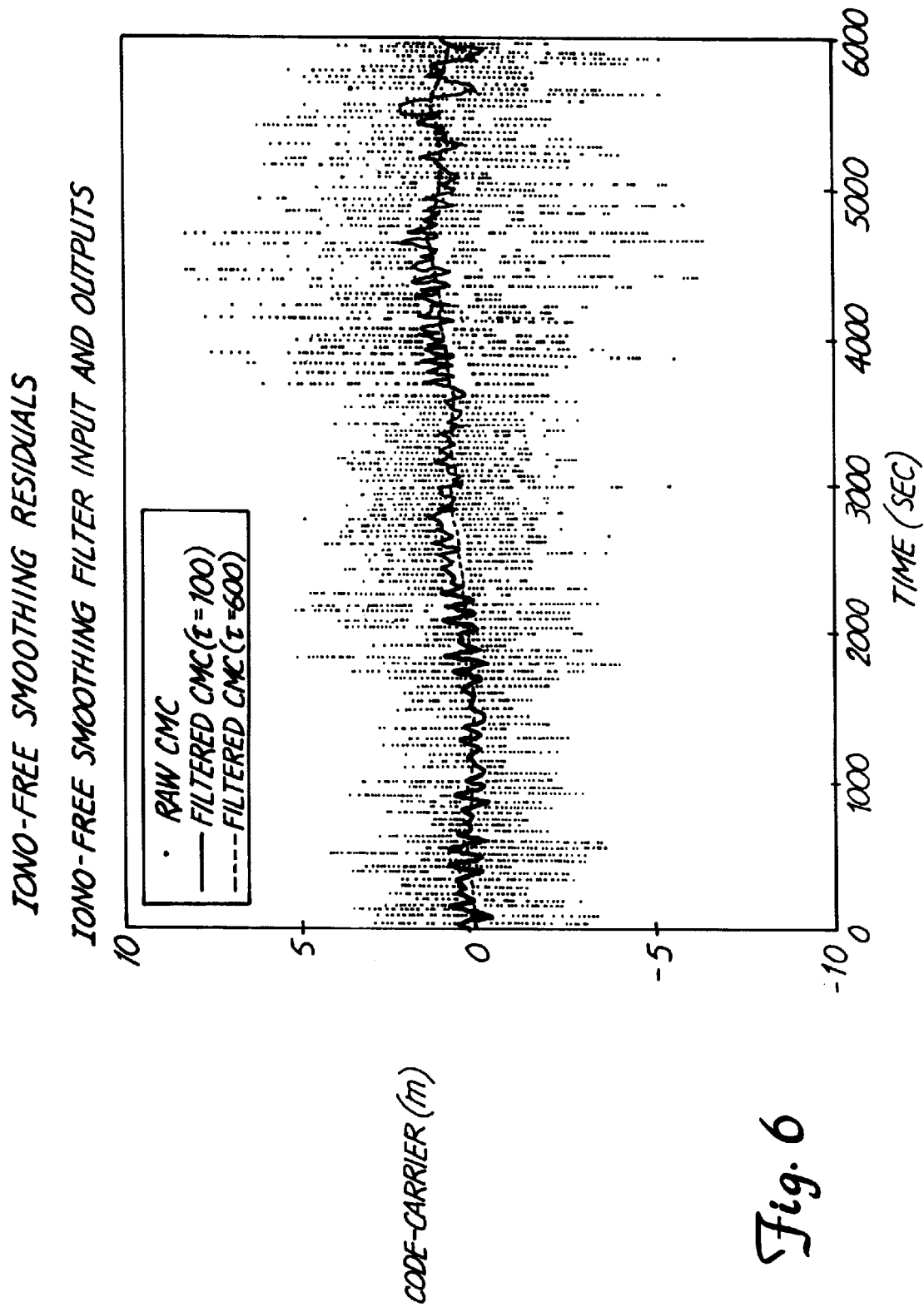
FIG. 6 is a plot illustrating the input and output of an iono-free smoothing filter in accordance with the present invention.

The residuals plotted in FIG. 5 are for the divergence-free smoothing technique, corresponding to the code and carrier inputs shown in Equations 5 and 6. The iono divergence is removed from the raw CMC and both filtered CMC signals track the long-term behavior of the raw signal, which demonstrates the potential for using extremely long smoothing time constants. The residuals for the long-free technique are shown in FIG. 6. Again, the long-term iono divergence has been eliminated. However, note that these residuals are substantially noisier than those in FIG. 5 because they contain additional error terms from the L2 code pseudorange.

Although the present invention has been described with reference to preferred embodiments, workers skilled in the art will recognize that changes may be made in form and detail without departing from the spirit and scope of the invention For example, while the present invention is often described with specific reference to the GPS navigational system, it can be used with and applies to other GNSS as well.

What is claimed is:

1. A method of smoothing a global navigational satellite system (GNSS) code pseudorange measurement, the method comprising:

tracking a first GNSS signal, at a first frequency, from a first satellite;

tracking a second GNSS signal, at a second frequency, from the first GNSS satellite;

determining a first pseudorange measurement $\rho_1$ from the tracked first GNSS signal;

calculating a smoothed pseudorange measurement $\hat{\Psi}$ from the determined first pseudorange measurement $\rho_1$ as a function of both the first and second GNSS signals.

2. The method of claim 1, wherein calculating the smoothed pseudorange measurement $\hat{\Psi}$ further comprises calculating the smoothed pseudorange measurement $\hat{\Psi}$ from the determined first pseudorange measurement $\rho_1$ as a function of a generalized code pseudorange measurement $\Psi$ and as a function of a generalized carrier phase measurement $\Phi$, wherein at least one of the generalized code pseudorainge measurement $\Psi$ and the generalized carrier phase measurement $\Phi$ are dual frequency measurements determined as a function of both the first and second GNSS signals.

3. The method of claim 2, and further comprising:

measuring a first carrier phase from the first GNSS signal to obtain a first carrier phase measurement $\phi_1$;

measuring a second carrier phase from the second GNSS signal to obtain a second carrier phase measurement $\phi_2$; and wherein calculating the smoothed pseudorange measurement $\hat{\Psi}$ includes calculating the smoothed pseudorange measurement $\hat{\Psi}$ as a function of both of the first carrier phase measurement $\phi_1$ and the second carrier phase measurement $\phi_2$.

4. The method of claim 3, wherein calculating the smoothed pseudorange measurement $\hat{\Psi}$ as a function of both of the first carrier phase measurement $\phi_1$ and the second carrier phase measurement $\phi_2$ further comprises calculating the smoothed pseudorange measurement as a function of a difference between the first and second carrier phase measurements.

5. The method of claim 4, wherein the first GNSS signal is an L1 GNSS signal and the second GNSS signal is an L2 GNSS signal.

6. The method of claim 4, wherein calculating the smoothed pseudorange measurement $\hat{\Psi}$ further comprises calculating the smoothed pseudorange measurement $\hat{\Psi}$ as a function of the generalized code pseudorange measurement $\Psi$ and as a function of the generalized carrier phase measurement $\Phi$ defined by the relationships:

$$\Psi = \rho_1$$

$$\Phi = \phi_1 - 2/\alpha(\phi_1 - \phi_2).$$

7. The method of claim 4, wherein calculating the smoothed pseudorange measurement $\hat{\Psi}$ further comprises calculating the smoothed pseudorange measurement $\hat{\Psi}$ as a function of the generalized code pseudorange measurement Ψ and as a function of the generalized carrier phase measurement Φ defined by the relationship:

$$\Psi = \rho_2$$

$$\Phi = \phi_2 - 2/\beta(\phi_2 - \phi_1).$$

8. The method of claim 4, and further comprising determining a second pseudorange measurement $\rho_2$ from the tracked second GNSS signal.

9. The method of claim 8, wherein the smoothed pseudorange measurement $\hat{\Psi}$ does not contain an ionspheric delay component.

10. The method of claim 9, wherein calculating the smoothed pseudorange measurement $\hat{\Psi}$ further comprises calculating the smoothed pseudorange measurement $\hat{\Psi}$ as a function of the generalized code pseudorange measurement Ψ and as a function of the generalized carrier phase measurement Φ defined by the relationships:

$$\Psi = \rho_1 - 1/\alpha(\rho_1 - \rho_2) \equiv \rho_2 - 1/\beta(\rho_2 - \rho_1) \text{ and}$$

$$\Phi = \phi_1 - 1/\alpha(\phi_1 - \phi_2) \equiv \phi_2 - 1/\beta(\phi_2 - \phi_1).$$

11. A method of smoothing global navigational satellite system (GNSS) code pseudorange measurements, the method comprising:

tracking a first GNSS signal, at a first frequency, from a first satellite;

tracking a second GNSS signal, at a second frequency, from the first GNSS satellite;

determined a generalized code pseudorange measurement Ψ from at least one of the first and second GNSS signals;

determining a generalized carrier phase measurement Φ from at least one of phase first and second GNSS signals, wherein at least one of the generalized code pseudorange measurement Ψ and the generalized carrier phase measurement Φ is determined from both of the first and second GNSS signals;

subtracting the generalized carrier phase measurement Φ from the generalized code pseudorange measurement Ψ to obtain difference data;

filtering the difference data to obtain filtered difference data having components removed; and adding the generalized carrier phase measurement Φ to the filtered difference data to obtain a smoothed pseudorange measurement $\hat{\Psi}$.

12. The method of claim 11, and further comprising:

determining a first pseudorange measurement $\rho_1$ from the tracking first GNSS signal, wherein determining the generalized code pseudorange measurement Ψ further includes determining the generalized code pseudorange measurement Ψ as a function for the first pseudorange measurement $\rho_1$;

determining a first carrier phase from the first GNSS signal to obtain a first carrier phase measurement $\phi_1$; and determining a second carrier phase from the second GNSS signal to obtain a second carrier phase measurement $\phi_2$, wherein determining the generalized carrier phase measurement Φ further includes determining the generalized carrier phase measurement Φ as a function of both the first carrier phase measurement $\phi_1$ and the second carrier phase measurement $\phi_2$.

13. The method of claim 12, wherein determining the generalized carrier phase measurement Φ as a function of both the first carrier phase measurement $\phi_1$ and the second carrier phase measurement $\phi_2$ further includes determining the generalized carrier phase measurement Φ as a function of a difference between the first carrier phase measurement $\phi_1$ and the second carrier phase measurement $\phi_2$.

14. The method of claim 13, wherein determining the generalized code pseudorange measurement Ψ and determining the generalized carrier phase measurement Φ further includes determining the generalized code pseudorange measurement Ψ and the generalized carrier phase measurement Φ using the relationships:

$$\Psi = \rho_1$$

$$\Phi = \phi_1 - 2/\alpha(\phi_1 - \phi_2).$$

15. The method of claim 14, and further comprising determining a second pseudorange measurement $\rho_2$ from the tracked second GNSS signal.

16. The method of claim 15, wherein determining the generalized code pseudorange measurement Ψ and determining the generalized carrier phase measurement Φ further include determining the generalized code pseudorange measurement Ψ and the generalized carrier phase measurement Φ using the relationships:

$$\Psi = \rho_1 - 1/\alpha(\rho_1 - \rho_2) \equiv \rho_2 - 1/\beta(\rho_2 - \rho_1) \text{ and}$$

$$\phi = \phi_1 - 1/\alpha(\phi_1 - \phi_2) \equiv \phi_2 - 1/\beta(\phi_2 - \phi_1).$$

17. The method of claim 13, wherein determining the generalized code pseudorange measurement Ψ and determining the generalized carrier phase measurement Φ further includes determining the generalized code pseudorange measurement Ψ and the generalized carrier phase measurement Φ using the relationships:

$$\Psi = \rho_2$$

$$\Phi = \phi_2 - 2/\beta(\phi_2 - \phi_1).$$

18. A global navigational satellite system (GNSS) receiving apparatus comprising:

signal tracking means for tracking a first GNSS signal, at a first frequency, from a first satellite and a second GNSS signal, at a second frequency, from the first GNSS satellite;

pseudorange determining means for determining a first pseudorange measurement $\rho_1$ from the first GNSS signal; and pseudorange measurement smoothing means for calculating a smoothed pseudorange measurement $\hat{\Psi}$ from the determined first pseudorange measurement $\rho_1$ as a function of both the first GNSS signal and as a function of the second GNSS signal.

* * * * *